United States Patent
Naito

(10) Patent No.: US 11,519,738 B2
(45) Date of Patent: *Dec. 6, 2022

(54) POSITION CALCULATING APPARATUS

(71) Applicant: TOYOTA JIDOSHA KABUSHIKI KAISHA, Toyota (JP)

(72) Inventor: Takashi Naito, Tajimi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 275 days.

This patent is subject to a terminal disclaimer.

(21) Appl. No.: 16/912,117

(22) Filed: Jun. 25, 2020

(65) Prior Publication Data
US 2020/0326191 A1    Oct. 15, 2020

Related U.S. Application Data

(63) Continuation of application No. 15/799,226, filed on Oct. 31, 2017, now Pat. No. 10,731,996.

(30) Foreign Application Priority Data

Dec. 27, 2016    (JP) ................................. 2016-252970

(51) Int. Cl.
| | | |
|---|---|---|
| *G01C 21/30* | (2006.01) | |
| *B60R 1/00* | (2022.01) | |
| *G08G 1/0962* | (2006.01) | |
| *G06T 7/70* | (2017.01) | |
| *G06T 7/73* | (2017.01) | |
| *G01C 21/28* | (2006.01) | |
| *G06V 10/44* | (2022.01) | |
| *G06V 10/75* | (2022.01) | |
| *G06V 20/56* | (2022.01) | |

(52) U.S. Cl.
CPC ................. *G01C 21/30* (2013.01); *B60R 1/00* (2013.01); *G01C 21/28* (2013.01); *G06T 7/70* (2017.01);
(Continued)

(58) Field of Classification Search
CPC ........... G06V 10/751; G06T 7/70; G06T 7/74; G01C 21/30
(Continued)

(56) References Cited

U.S. PATENT DOCUMENTS

| | | |
|---|---|---|
| 9,672,734 B1 | 6/2017 | Ratnasingam |
| 9,898,669 B2 | 2/2018 | Nishijima |

(Continued)

FOREIGN PATENT DOCUMENTS

| | | |
|---|---|---|
| JP | 2000-074679 A | 3/2000 |
| JP | 2005265494 A | 9/2005 |

(Continued)

*Primary Examiner* — On S Mung
(74) *Attorney, Agent, or Firm* — Sughrue Mion, PLLC

(57) ABSTRACT

A position calculating apparatus is provided with: an acquirer configured to obtain a position of a host vehicle; a detector configured to detect surrounding environment including structures around the host vehicle; a calculator configured to extract a map of surroundings of the host vehicle on the basis of the obtained position, configured to compare the extracted map with a surrounding image based on the detected surrounding environment, and configured to calculate a position and a direction of the host vehicle on the extracted map; a display device configured to superimpose and display the extracted map on the surrounding image on the basis of the calculated position and the calculated direction; and a corrector configured to correct the calculated position and the calculated direction with reference to a inputted correction instruction if the correction instruction is inputted through an input device.

12 Claims, 5 Drawing Sheets

(52) U.S. Cl.
CPC ............... *G06T 7/74* (2017.01); *G06V 10/44* (2022.01); *G06V 10/751* (2022.01); *G08G 1/09623* (2013.01); *B60R 2300/102* (2013.01); *B60R 2300/302* (2013.01); *B60R 2300/607* (2013.01); *G06T 2207/30244* (2013.01); *G06T 2207/30252* (2013.01); *G06V 20/588* (2022.01)

(58) Field of Classification Search
USPC ........................................................ 701/446
See application file for complete search history.

(56) References Cited

U.S. PATENT DOCUMENTS

| | | |
|---|---|---|
| 10,072,328 B2 | 9/2018 | Ghosh et al. |
| 10,337,881 B2 | 7/2019 | Kim |
| 10,339,393 B2 | 7/2019 | Masui et al. |
| 10,427,689 B2 | 10/2019 | Tokimasa et al. |
| 10,486,698 B2 | 11/2019 | Masui et al. |
| 10,731,996 B2 | 8/2020 | Naito |
| 10,922,561 B2 | 2/2021 | Ozawa et al. |
| 11,072,328 B2 | 7/2021 | Masui et al. |
| 11,235,766 B2 | 2/2022 | Masui et al. |
| 2017/0227970 A1 | 8/2017 | Taguchi et al. |
| 2017/0307395 A1 | 10/2017 | Kim |
| 2018/0172468 A1 | 6/2018 | Sagall |
| 2018/0180422 A1 | 6/2018 | Naito |

FOREIGN PATENT DOCUMENTS

| | | |
|---|---|---|
| JP | 2005-326168 A | 11/2005 |
| JP | 2009-227196 A | 10/2009 |
| JP | 2016170060 A | 9/2016 |
| JP | 2017-138282 A | 8/2017 |
| JP | 2018-26044 A | 2/2018 |

POSITION CALCULATING APPARATUS

CROSS-REFERENCE TO RELATED APPLICATIONS

This application is a continuation application of U.S. application No. 15/799,226, filed on Oct. 31, 2017, which is based upon and claims the benefit of priority of the prior Japanese Patent Application No. 2016-252970, filed on Dec. 27, 2016, the entire contents of which are incorporated herein by reference.

BACKGROUND OF THE INVENTION

1. Field of the Invention

Embodiments of the present invention relate to a position calculating apparatus configured to calculate a position of a host vehicle.

2. Description of the Related Art

For this type of apparatus, for example, there is proposed an apparatus (i) configured to generate, by using a 3D map, a vehicle-outside-image to be captured from a position of a host vehicle, and (ii) configured to compare the generated vehicle-outside-image with an image captured by an in-vehicle camera, thereby calculating a detailed position of the host vehicle (refer to Japanese Patent Application Laid Open No. 2005-326168).

There is also proposed an apparatus configured to display offset degree of a running path of the host vehicle with respect to a reference line, when running control for allowing the host vehicle to run along the reference line is not performed, and configured to correct the offset degree on the basis of an occupant's input (refer to Japanese Patent Application Laid Open No. 2009-227196). There is also proposed an apparatus configured to correct a host vehicle position, which is displayed on a map screen of a navigation apparatus, on the basis of a user's correction instruction input when the host vehicle runs on a road that is not included in map data (refer to Japanese Patent Application Laid Open No. 2000-074679).

A technique/technology described in Japanese Patent Application Laid Open No. 2005-326168 premises that a difference between the vehicle-outside-image generated by using the 3D map and the image captured by the in-vehicle camera is accurately recognized. The difference is, however, possibly not accurately recognized in the following cases, i.e. when information included in the 3D map is insufficient, when there is a change in an actual road due to e.g. road construction, when a lane and road marking are blurred, when a road is wet, when there is a puddle and a shadow on a road, or in similar cases. As a result, the detailed position of the host vehicle is possibly incorrectly calculated.

SUMMARY

In view of the aforementioned problems, it is therefore an object of embodiments of the present invention to provide a position calculating apparatus configured to suppress erroneous recognition of a position of a host vehicle.

The above object of embodiments of the present invention can be achieved by a position calculating apparatus is provided with: an acquirer configured to obtain a position of a host vehicle; a storage configured to store therein map information; a detector configured to detect surrounding environment including structures around the host vehicle; a calculator configured to extract a map of surroundings of the host vehicle on the basis of the obtained position and the map information, configured to compare the extracted map with a surrounding image based on the detected surrounding environment, and configured to calculate a position and a direction of the host vehicle on the extracted map; a display device configured to superimpose and display the extracted map on the surrounding image on the basis of the calculated position and the calculated direction; an input device configured to input a correction instruction by a user of the host vehicle; and a corrector configured to correct the calculated position and the calculated direction with reference to the inputted correction instruction if the correction instruction is inputted through the input device.

The acquirer is configured to obtain the position of the host vehicle, for example, by receiving radio waves from positioning satellites, or on the basis of outputs of an internal sensor such as a gyro sensor and a vehicle speed sensor. Here, the position of the host vehicle obtained by the positioning satellites and the internal sensor is relatively less accurate, and hardly satisfies position accuracy required for an advanced driving support system and an advanced automatic driving system (e.g. within an error of 1 meter, etc.). Thus, on the position calculating apparatus, the map information and the surrounding image based on the surrounding environment detected by the detector (i.e. a sensing result) may be used to calculate the position and direction of the host vehicle with relatively high accuracy.

By the way, for example, if there is a difference to a greater or lesser extent between the map information and an actual road, the map information and the surrounding image are possibly erroneously compared. On the position calculating apparatus, the map of the surroundings of the host vehicle and the surrounding image may be superimposed and displayed, i.e. may be visualized. If the correction instruction is inputted by the user who determines that the display is incorrect (i.e. that the map information and the surrounding image are erroneously compared), the position and direction of the host vehicle calculated from the map information and the surrounding image may be corrected. Therefore, according to the position calculating apparatus, it is possible to suppress the erroneous recognition of the position of the host vehicle.

In one aspect of the position calculating apparatus according to embodiments of the present invention, the calculator is configured to calculate the position and direction of the host vehicle on the extracted map on the basis of a correlation between the extracted map and the surrounding image. According to this aspect, it is possible to relatively easily calculate the position and direction of the host vehicle on the map. The correlation may be obtained by a method of frequency analysis such as e.g. phase only correlation (POC). Needless to say, the correlation may be obtained by a method other than the method of frequency analysis.

In another aspect of the position calculating apparatus according to embodiments of the present invention, said calculator is configured to calculate the position and direction of the host vehicle on the extracted map on the basis of a correlation image illustrating a distribution of a correlation value, as a correlation between the extracted map and the surrounding image, which is obtained by performing predetermined frequency analysis on each of an image based on the extracted map and the surrounding image, the correction instruction includes an instruction for correcting a position shift between the extracted map superimposed and displayed by said display device and the surrounding image, and said corrector is configured to set a search range on the correction image on the basis of the instruction for correcting the position shift included in the inputted correction instruction and is configured to correct the calculated position and the calculated direction on the basis of the correlation value in the set search range.

It is assumed, for example, that the surrounding image includes dashed deceleration marking as road marking. In this case, if the correlation between the extracted map and the surrounding image is obtained, the correlation value is possibly the maximum or local maximum, not only when a lane included in the surrounding image overlaps a lane included in the map, but also when the dashed deceleration marking included in the surrounding image overlaps the lane included in the map. Here, a position at which the correlation value is the maximum or local maximum on the correlation image may correspond to a shift amount candidate between the extracted map and the surrounding image.

If the position and direction of the host vehicle are calculated on the basis of the position at which the correlation value is the maximum or local maximum on the correlation image due to the overlap between the dashed deceleration marking included in the surrounding image and the lane included in the map, the position and direction of the host vehicle may be erroneously obtained. At this time, if the position at which the correlation value is the maximum or local maximum (i.e. shift amount) is selected from the correlation image without any restriction, the selection possibly leads to another erroneous result.

On the position calculating apparatus, the search range on the correlation image may be set on the basis of the correction instruction, and the position and direction of the host vehicle may be corrected on the basis of the correlation value in the search range. By setting the search range, it is possible to increase the possibility of selecting the position at which the correlation value is the maximum or local maximum, which corresponds to a true shift amount. The position and direction of the host vehicle after the correction are therefore expected to be accurate.

In another aspect of the position calculating apparatus according to embodiments of the present invention, the detector has a camera configured to image the surroundings of the host vehicle, the detector is configured to detect the surrounding environment by imaging the surroundings of the host vehicle with the camera, and the calculator is configured to generate, as the surrounding image, an overhead image of the surroundings of the host vehicle from an image captured by the camera, and is configured to calculate the position and direction of the host vehicle on the extracted map on the basis of a correlation between the generated overhead image and the extracted map. According to this aspect, it is possible to relatively easily obtain the correlation, which is extremely useful in practice.

In another aspect of the position calculating apparatus according to embodiments of the present invention, the map information includes line data indicating a lane, and the display device is configured to superimpose and display, as the extracted data, line data indicating a lane in the surroundings of the host vehicle, on the surrounding image. According to this aspect, the user can relatively easily determine whether or not the display is incorrect.

In another aspect of the position calculating apparatus according to embodiments of the present invention, the map information includes data indicating road marking and signs, and the display device is configured to superimpose and display, as the extracted data, data indicating at least one of road marking and signs in the surroundings of the host vehicle, on the surrounding image. According to this aspect, the user can relatively easily determine whether or not the display is incorrect.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS

A position calculating apparatus according to embodiments of the present invention will be explained with reference to FIG. 1 to FIG. 7.

(Configuration of Apparatus)

Figure 1:
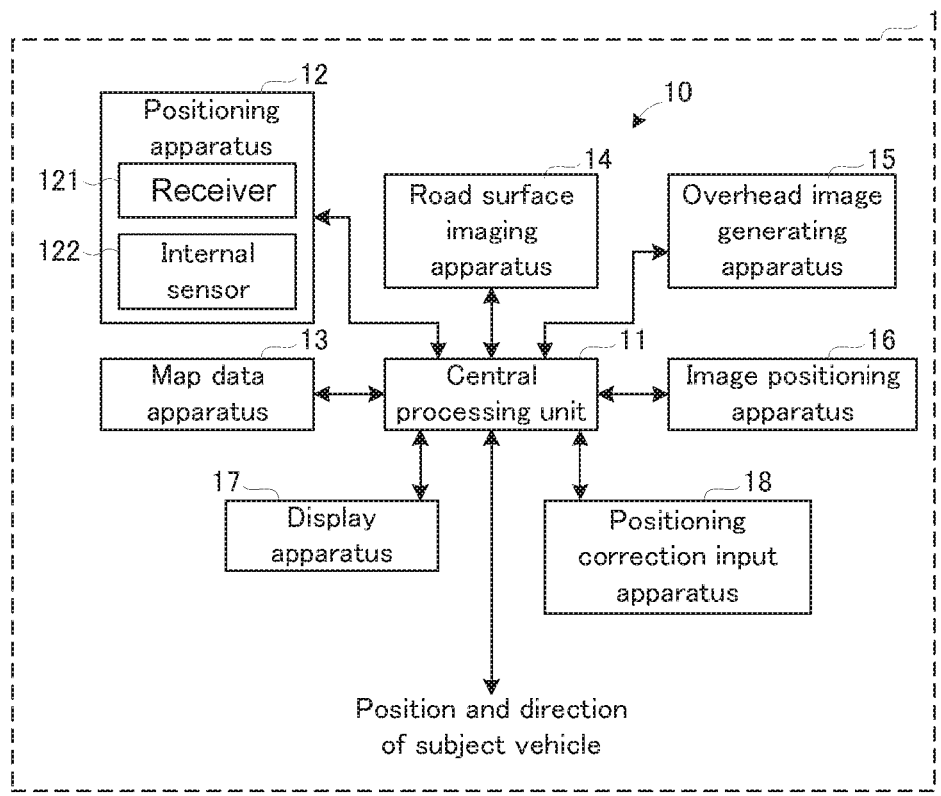
FIG. 1 is a block diagram illustrating a configuration of a position calculating apparatus according to an embodiment.

A configuration of a position calculating apparatus according to an embodiment will be explained with reference to FIG. 1. FIG. 1 is a block diagram illustrating the configuration of the position calculating apparatus according to the embodiment.

In FIG. 1, a position calculating apparatus 10 is mounted on a vehicle 1. The position calculating apparatus 10 is provided with a central processing unit (CPU) 11, a positioning apparatus 12, a map data apparatus 13, a road surface imaging apparatus 14, an overhead image generating apparatus 15, an image positioning apparatus 16, a display apparatus 17, and a positioning correction input apparatus 18. The CPU 11 is provided with e.g. a memory, a processor, and the like. The CPU 11 is configured to transmit signals indicating a position and a direction of a vehicle 1, for example, to a not-illustrated control apparatus of a driving support system, which allows a driving support operation to be performed, a not-illustrated control apparatus of an automatic driving system, which allows an automatic driving operation to be performed, or the like.

The positioning apparatus 12 has a receiver 121 and an internal sensor 122. The receiver 121 is configured to receive satellite signals such as e.g. navigation signals from navigation satellites. The internal sensor 122 includes e.g. a gyro sensor, a vehicle speed sensor, and the like. The positioning apparatus 12 is configured to measure the position of the vehicle 1 on the basis of the satellite signals received by the receiver 121. The positioning apparatus 12 is further configured to measure the direction of the vehicle 1 (e.g. posture) on the basis of outputs of the internal sensor 122. In other words, the positioning apparatus 12 has, for example, both functions of a global navigation satellite system (GNSS) and an inertial measurement unit (IMU).

The positioning apparatus 12 may have a function of dead reckoning (DR) in which the position of the vehicle 1 is measured on the basis of the outputs of the internal sensor 122.

The map data apparatus 13 is a database configured to store therein map information. The map information includes e.g. road position information (or information for each lane), road shape information (e.g. road type such as a curve and a straight section, curvature of a curve, etc.), road width information (or lane width information), road slope information, road cant angle information, information about vehicle speed limit on a road, and the like. The map information also includes intersection/junction position information, stop line position information, pedestrian crossing position information, traffic light position information, and the like. The map information includes: white line position information, which may be stored not as a line but as a sequence of points; white line type information; information about the position and shape of fixed obstacles such as e.g. curbstones, electric poles, poles, guard rails, walls, and buildings; information about the position and shape of road marking such as letters and marks drawn on a road surface; information about the position and shape of marking on roads indicating information such as geographical guidance, road warning, and regulation; and the like.

The road surface imaging apparatus 14 is provided with a camera configured to image the outside of the vehicle 1. The overhead image generating apparatus 15 is configured to generate an overhead image from the position and direction of the vehicle 1 measured by the positioning apparatus 12 and from the image captured by the road surface imaging apparatus 14.

The image positioning apparatus 16 is configured to calculate a position and a direction of the vehicle 1 on a map, by comparing or checking the map information about surroundings of the vehicle 1, which is extracted from the map data apparatus 13 on the basis of the position of the vehicle 1 measured by the positioning apparatus 12, with the overhead image generated by the overhead image generating apparatus 15.

The display apparatus is configured to superimpose and display the map information about the surroundings of the vehicle 1, on the image captured by the camera of the road surface imaging apparatus 14, on the basis of the position and direction of the vehicle 1 calculated by the image poisoning apparatus 16.

The positioning correction input apparatus 18 is provided with an input device configured to receive a correction instruction by an occupant of the vehicle 1 described later, such as e.g. a touch panel and an operation button.

(Position Correcting Process)

According to the position calculating apparatus 10 configured in the above manner, the map information and the overhead image may be compared, by which the position of the vehicle 1 can be obtained, relatively accurately. In other words, on the position calculating apparatus 10, the position of the vehicle 1 can be relatively accurately obtained on the basis of the position on the map (e.g. latitude, longitude).

However, in a place in which marking similar to a lane, i.e. dashed deceleration marking and a buffer zone, is drawn in the vicinity of the lane, such as near a junction, there is a possibility that the map information and the overhead image are erroneously compared. In an example illustrated in FIG. 2, the dashed deceleration marking is erroneously recognized to be a lane, wherein a line b1 in FIG. 2 indicates a lane included in the map information. Such erroneous recognition likely occurs when the information included in the map information is insufficient, or when there is a change in an actual road due to e.g. road construction or the like.

Taking no measures for the erroneous recognition possibly results in a reduction in control accuracy associated with e.g. the driving support operation, the automatic driving operation, or the like, which use position information about the vehicle 1. Thus, the position calculating apparatus 10 is configured in such a manner that the position of the vehicle 1 obtained by comparing the map information with the overhead image is corrected on the basis of the correction instruction by the occupant inputted through the positioning correction input apparatus 18.

The position calculating operation performed by the position calculating apparatus 10 and a position correcting process performed as a part of the position calculating operation will be explained with reference to flowcharts in FIG. 3 and FIG. 4.

Figure 3:
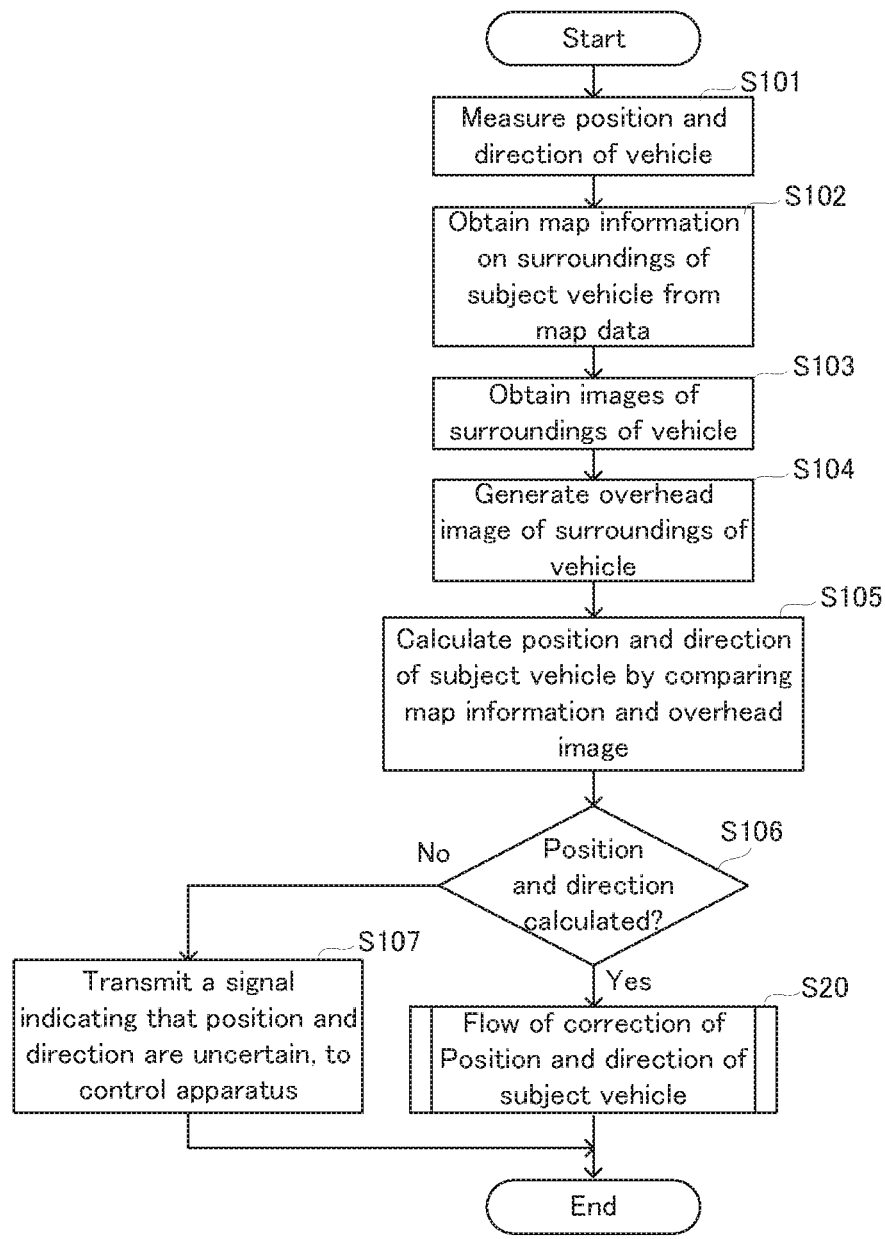
FIG. 3 is a flowchart illustrating a position calculating operation according to the embodiment.

In FIG. 3, firstly, the positioning apparatus 12 measures the position of the vehicle 1 on the basis of the satellite signals received by the receiver, and measures the direction of the vehicle 1 on the basis of the outputs of the internal sensor 122 (step S101). The CPU 11 then extracts the map information about the surroundings of the vehicle 1 from the map data apparatus 13 on the basis of the measured position and direction of the vehicle 1 (step S102). The CPU 11 obtains the image captured by the camera of the road surface imaging apparatus 14, in parallel with the step S101 and the step S102 (step S103).

The CPU 11 then transmits the signals indicating the measure position and direction of the vehicle 1 and a signal indicating the captured image to the overhead image generating apparatus 15. The overhead image generating apparatus 15 generates the overhead image of the surroundings of the vehicle 1 on the basis of the captured image and on the basis of the measured position and direction of the vehicle 1 (step S104). Specifically, the overhead image generating apparatus 15 projection-transforms at least a part of one captured image (e.g. a part in which a road surface is imaged) on the basis of a camera parameter, such as e.g. installation position and posture, associated with the camera of the road surface imaging apparatus 14, thereby generating an overhead image at a time point. The overhead image generating apparatus 15 superimposes a plurality of overhead images generated at consecutive time points, on the basis of the position and direction of the vehicle 1 at the respective time points, thereby generating e.g. an overhead image of the road surface centered on the vehicle 1. The overhead image generating apparatus 15 transmits a signal indicating the generated overhead image to the CPU 11.

The CPU 11 then transmits signals indicating the overhead image generated by the overhead image generating apparatus 15 and the map information extracted in the step S102, to the image positioning apparatus 16. The image positioning apparatus 16 calculates the position and direction of the vehicle 1 on the map by comparing the map information (or specifically a pseudo road surface image based on the map information, such as e.g. an image in which a lane part is white and the other part is black, with the overhead image) with the overhead image (step S105). The comparison between the map information and the overhead image may use e.g. phase only correlation.

Here, it is assumed that spatial frequency of the overhead image is "F(u)", that spatial frequency of the pseudo road surface image is "G(u)", and that weight of normalization is "a". A correlated distribution H(u) by the phase only correlation is expressed as follows.

$$H(u)=F(u)G(u)/[|F(u)|G(u))|]^a$$

The image positioning apparatus 16 obtains the position and direction of the vehicle 1 on the map by obtaining a position at which a correlation value is a maximum on a correlation image indicated by the correlated distribution H(u). The correlation image namely corresponds to an image in a real area obtained by performing inverse Fourier transformation on the correlated distribution H(u).

The position at which the correlation value is the maximum or local maximum on the correlation image, i.e. peak position, indicates a shift amount between the overhead image and the pseudo road surface image. The presence of a plurality of peak positions means the presence of a plurality of shift amount candidates. Therefore, obtaining the position at which the correlation value is the maximum on the correlation image means obtaining the shift amount between the overhead image and the pseudo road surface image. The position and direction of the vehicle 1 on the map are thus obtained by obtaining the position at which the correlation value is the maximum on the correlation image.

The CPU 11 then determines whether or not the position and direction of the vehicle 1 are calculated (step S106). Here, for example, if the maximum value of the correlation is less than or equal to a first threshold value when the position and direction of the vehicle 1 are obtained in the step S105, the CPU 11 may determine that the obtained position and direction of the vehicle 1 do not satisfy a predetermined criterion (in other words, reliability is not sufficient), thereby determining that the position and direction of the vehicle 1 are not calculated.

In the determination in the step S106, if it is determined that the position and direction of the vehicle 1 are not calculated (the step S106: No), the CPU 11 transmits a signal indicating that the position and direction of the vehicle 1 are uncertain, to the control apparatus of the driving support system, the control apparatus of the automatic driving system, or the like (step S107). After a lapse of a first predetermined time, the step S101 is performed again.

On the other hand, in the determination in the step S106, if it is determined that the position and direction of the vehicle 1 are calculated (the step S106: Yes), the CPU 11 performs the process of correcting the position and direction of the vehicle 1 illustrated in FIG. 4 (step S120).

Figure 2:
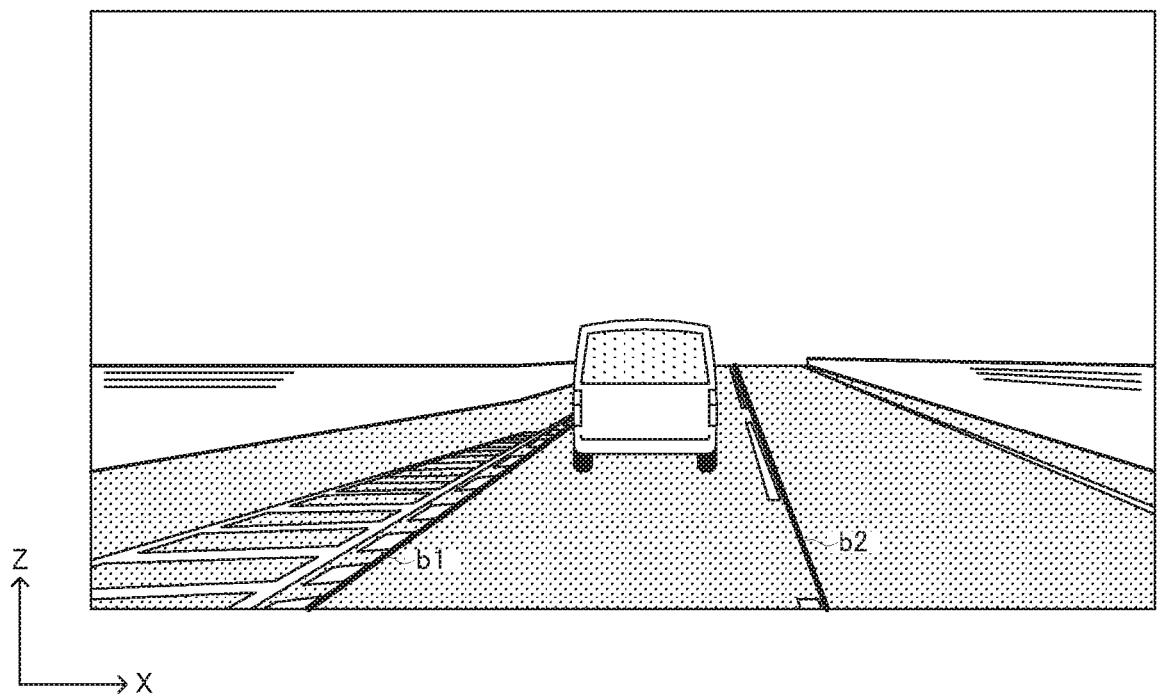
FIG. 2 is a diagram illustrating one example of a surrounding image on which map information is superimposed.
Figure 4:
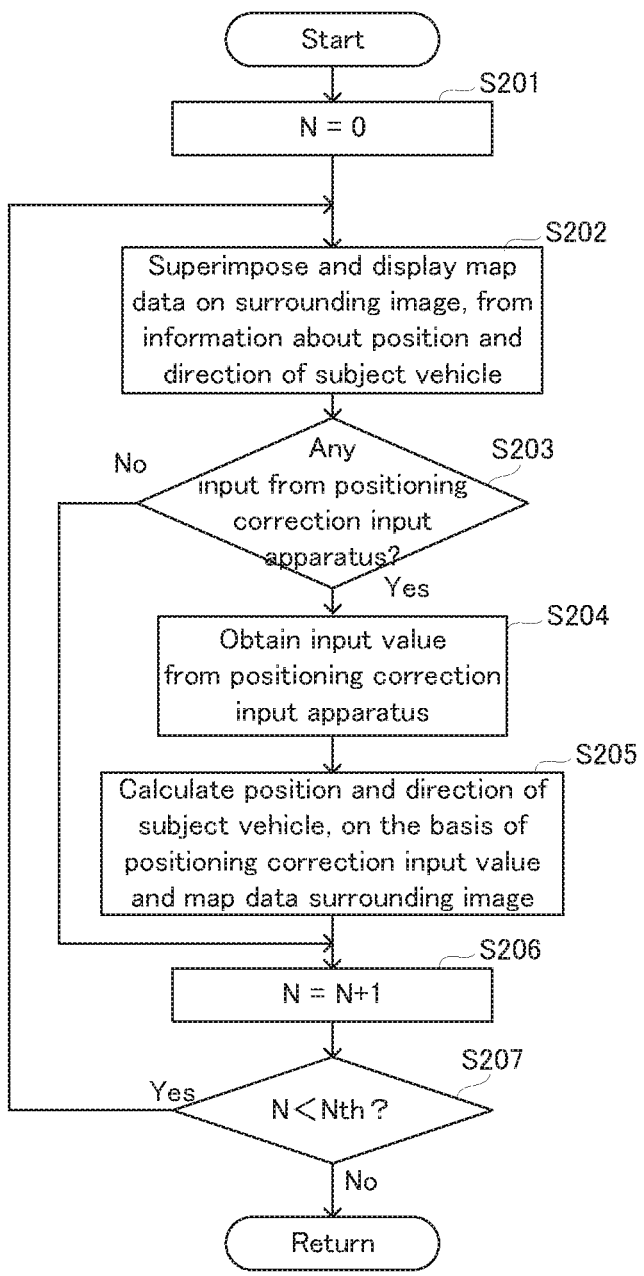
FIG. 4 is a flowchart illustrating a position correcting process according to the embodiment.

In FIG. 4, firstly, the CPU 11 sets a number of repetitions N to "0"; namely, the CPU 11 initializes the number of repetitions N (step S201). The CPU 11 then controls the display apparatus 17 to superimpose and display the map information about the surroundings of the vehicle 1, on the image captured by the camera of the road surface imaging apparatus 14, on the basis of the position and direction of the vehicle 1 calculated by the image positioning apparatus 16 (step S202). As a result, for example, an image illustrated in FIG. 2 is displayed for the occupant of the vehicle 1.

The CPU 11 then determines whether or not the correction instruction by the occupant is inputted through the positioning correction input apparatus 18 (step S203). The CPU 11 may determine that the correction instruction is not inputted, for example, if the correction instruction is not inputted within a second predetermined time after the implementation of the step S202.

Figure 5A:
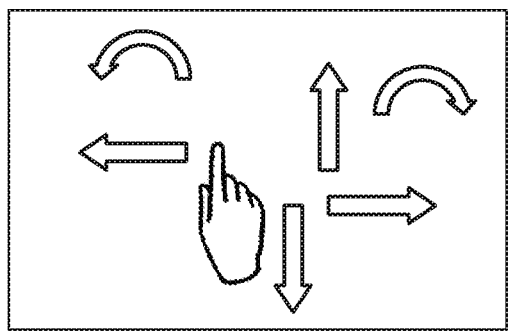
FIG. 5A and FIG. 5B are diagrams for explaining a concept of correction instruction by an occupant.
Figure 5B:
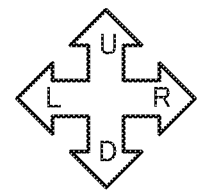

Here, if the positioning correction input apparatus 18 is a piezoelectric sensor mounted on a screen of the display apparatus 17, i.e. if the screen of the display apparatus 17 is a touch panel, the occupant can input the correction instruction by swiping the screen of the display apparatus 17 to the left, to the right, upward, downward, counterclockwise, or clockwise, as illustrated in FIG. 5A. If the positioning correction input apparatus 18 is, for example, a switch mounted on a not-illustrated steering wheel (refer to FIG. 5B), the occupant can input the correction instruction by operating the switch. Pressing "U" and "R" of the switch at the same time may indicate a "clockwise" instruction, and pressing "D" and "L" at the same time may indicate a "counterclockwise" instruction.

In the determination in the step S203, if it is determined that the correction instruction is not inputted (the step S203: No), a step S206 described later is performed. On the other hand, in the determination in the step S203, if it is determined that the correction instruction is inputted (the step S203: Yes), the CPU 11 obtains an input value associated with the correction instruction from the positioning correction input apparatus 18 (step S204).

The "input value" herein is a value according to the operation associated with the correction instruction by the occupant. As illustrated in FIG. 2, a horizontal axis of the image is set to an X axis. For example, if the occupant swipes to the left and a swipe length is "$-\Delta X$", then, the input value is "$-\Delta X$". The correction instruction by the occupant, however, is inputted during running of the vehicle 1 in most cases, and the correction instruction is not always correct. Thus, an upper limit value may be set for the input value associated with one correction instruction. Alternatively, regardless of an operation amount associated with the correction instruction by the occupant (e.g. the swipe length, a switch pressing time, etc.), a variation for one correction instruction (e.g. $\Delta X$) may be set as a fixed value, and a value that changes by the variation in an operating direction associated with the correction instruction may be set as the input value.

The CPU 11 then sets a search range on the correlation image on the basis of the input value and calculates the position and direction of the vehicle 1 on the map on the basis of the correction value in the set search range (step S205).

Here, it is assumed that the image displayed for the occupant has an XZ coordinate system and that the overhead image has an ENU coordinate system. The correction instruction is inputted by the occupant while the occupant is looking at the image as illustrated in FIG. 2, and the input value is thus a value in the XZ coordinate system. The CPU 11 thus transforms the input value to a value in the ENU coordinate system. Specifically, when the input value in the XZ coordinate system is ($\Delta X$, $\Delta Z$) and the direction of the vehicle 1 is "$\theta$", the value in the ENU coordinate system to which the input value is transformed is ($\Delta e = \Delta X \cos(-\theta) - \Delta Z \sin(-\theta)$, $\Delta n = \Delta X \sin(-\theta) + \Delta Z \cos(-\theta)$).

Figure 6:
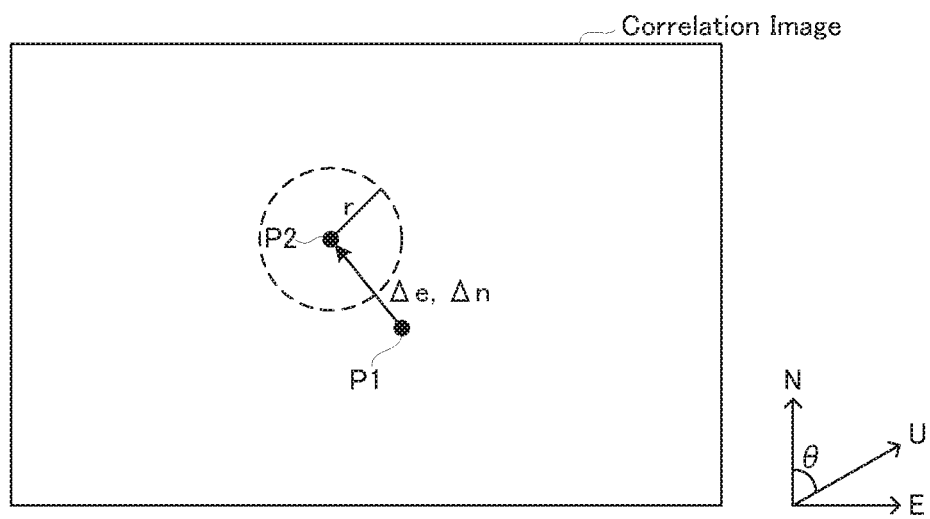
FIG. 6 is a diagram illustrating the position correcting process according to the embodiment.

The CPU 11 sets, as the search range, a circle with a radius r centered on coordinates (refer to a point P2 in FIG. 6) separated by the transformed input value ($\Delta e$, $\Delta n$) from coordinates (refer to a point P1 in FIG. 6) on the correlation image in which the correlation is maximal when the position and direction of the vehicle 1 are obtained in the step S105 (refer to FIG. 6). The CPU 11 then obtains a local maximum value (i.e. a maximal value) of the correlation in the search range. If the obtained local maximum value is greater than or equal to a second threshold value, the CPU 11 obtains the position and direction of the vehicle 1 from the position at which the correlation is the local maximum; namely, the CPU 11 corrects the position and direction of the vehicle 1. If the obtained local maximum value is less than the second threshold value, the CPU 11 does not correct the position and direction of the vehicle 1; namely, the position and direction of the vehicle 1 obtained in the step S105 are maintained.

As described above, in some cases, there are a plurality of peak positions at which the correlation value is the maximum or local maximum on the correlation image. In this case, the correlation value at a peak position corresponding to a true shift amount is sometimes lower than the correlation value at another peak position. If the position and direction of the vehicle 1 are obtained on the basis of the maximum value of the correlation in the step S105, the line b1 indicating the lane included in the map information is erroneously superimposed on the dashed deceleration marking, as illustrated, for example, in FIG. 2.

When the correction instruction by the occupant is inputted, if the position and direction of the vehicle 1 are obtained from a peak position at which the correlation value is second highest without any restriction (i.e. without setting the search range), that possibly leads to another erroneous result. It is thus possible to increase the possibility of obtaining the position and direction of the vehicle 1 from the peak position corresponding to the true shift amount, by setting the search range on the correlation image on the basis of the input value indicating the shift in any of the upper/lower/left/right directions (or parallel movement) or indicating the left or right rotation. In other words, the position and direction of the vehicle 1 after the correction are expected to be accurate.

The CPU 11 then increments the number of repetitions N (step S206), and determines whether or not the number of repetitions N is less than a third threshold value Nth (step S207). In the determination, if it is determined that the number of repetitions N is less than the third threshold value Nth (the step S207: Yes), the step S202 is performed.

On the other hand, if it is determined that the number of repetitions N is greater than or equal to the third threshold value Nth (the step S207: No), the correction process in the step S20 is ended (refer to FIG. 3). After a lapse of the first predetermined time, the step S101 is performed again.

Figure 7:
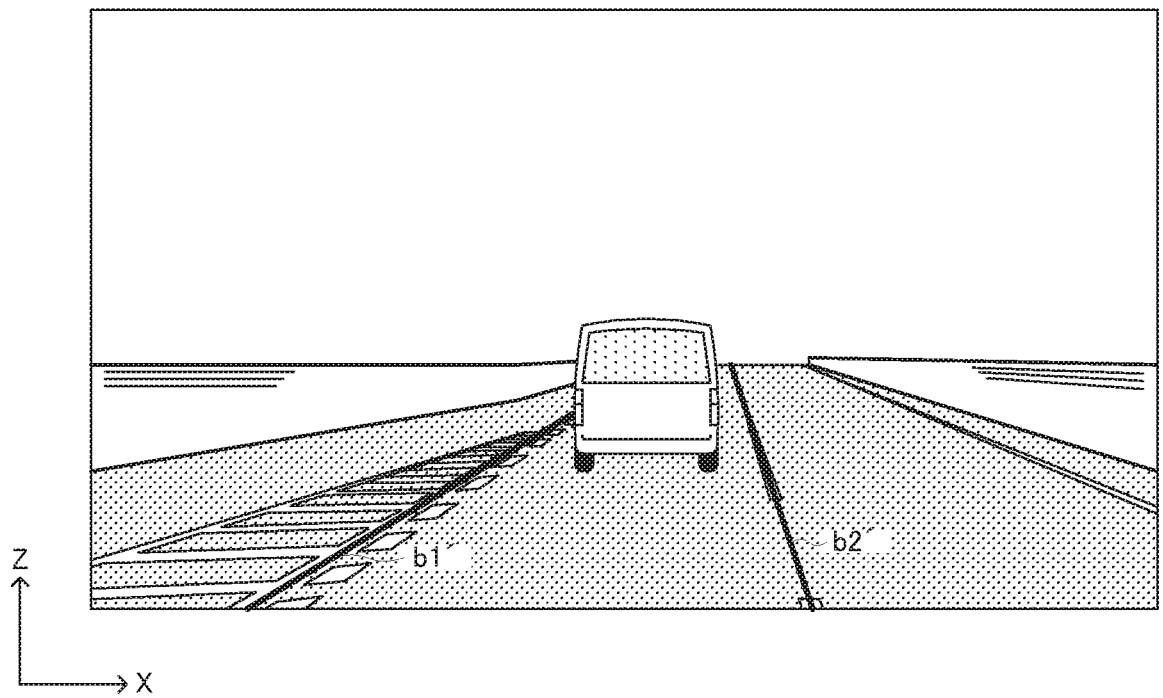
FIG. 7 is a diagram illustrating another example of the surrounding image on which map information is superimposed.

The step S202 to the step S207 is repeated, by which, for example, an image as illustrated in FIG. 7 is displayed for the occupant, wherein the displayed image illustrates that a line b1' and a line b2' indicating a lane included in the map information are superimposed on a lane part of the image captured by the camera of the road surface imaging apparatus 14.

The embodiment provides the example in which the lines b1, b2, b1' and b2' indicating the lane are superimposed on the image captured by the camera; however, road marking and signs or the like may be superimposed on the image captured by the camera in addition to or instead of the lane.

(Technical Effect)

According to the position calculating apparatus 10, the position and direction of the vehicle 1 are obtained from the position and direction of the vehicle 1 on the map, which are obtained by comparing the map information (or the pseudo road surface image in the embodiment) and the overhead image based on the image obtained by imaging the surroundings of the vehicle 1. It is thus possible to obtain the position and direction of the vehicle 1, relatively accurately. If the position and direction of the vehicle 1 obtained by the position calculating apparatus 10 are used, for example, in the driving support system, the automatic driving system, or the like, then, the control accuracy of those systems can be improved.

The position calculating apparatus 10 is provided with the positioning correction input apparatus 18 configured to receive the correction instruction by the occupant of the vehicle 1. When the correction instruction by the occupant is inputted through the positioning correction input apparatus 18, the map information and the overhead image are compared again, by which the position and direction of the vehicle 1 on the map are obtained again; namely, the position and direction are corrected. Therefore, according to the position calculating apparatus 10, it is possible to suppress the erroneous recognition of the position and direction of the vehicle 1.

Please note that the correction instruction by the occupant is used to set the search range as described above, and that the position and direction of the vehicle 1 are not corrected directly by the correction instruction.

The "poisoning apparatus 12", the "map data apparatus 13", the "road surface imaging apparatus 14", the "image positioning apparatus 16", the "display apparatus 17", the "positioning correction input apparatus 18", and the "CPU 11" according to the embodiment are respectively one example of the "acquirer", the "storage", the "detector", the "calculator", the "display device", the "input device", and the "corrector" according to embodiments of the present invention.

Modified Example

In the embodiment, the overhead image is generated from the image captured by the camera of the road surface imaging apparatus 14. However, instead of the road surface imaging apparatus 14, for example, laser imaging detection and ranging (LIDAR) may be used to obtain an image indicating surrounding environment of the vehicle and to generate the overhead image on the basis of the obtained image.

In the determination in the step S106 in FIG. 3, if it is determined that the position and direction of the vehicle 1 are calculated, i.e. if the maximum value of the correlation is greater than the first threshold value when the position and direction of the vehicle 1 are obtained, the CPU 11 may obtain reliability on the basis of the maximum value of the correlation, and may change a color of a line indicating the map information about the surroundings of the vehicle 1 (e.g. the line b1 and the line b2 in FIG. 2), which is superimposed and displayed on the image captured by the cameral of the road surface imaging apparatus 14, in accordance with the obtained reliability. For example, the color may be "blue" when the reliability is relatively high, and may be "red" when the reliability is relatively low.

The invention may be embodied in other specific forms without departing from the spirit or essential characteristics thereof. The present embodiments and examples are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A device of a host vehicle, the device comprising:
a memory configured to store instructions; and
a processor configured to execute the instructions to:
obtain map information of surroundings of the host vehicle;
obtain a surrounding image of the surroundings of the host vehicle;
compare the map information and the surrounding image;

determine a position and a direction of the vehicle, based on comparing the map information and the surrounding image;

control a display to display the map information superimposed on the surrounding image, based on the position and the direction of the host vehicle;

receive, from an input device of the host vehicle, a correction instruction input by a user of the host vehicle for correcting a position shift between the map information superimposed on the surrounding image;

compare the map information and the surrounding image, based on the correction instruction;

determine a corrected position and a corrected direction of the host vehicle, based on comparing the map information and the surrounding image; and transmit a control signal identifying the corrected position and the corrected direction of the host vehicle to a control apparatus of the host vehicle.

2. The device of the host vehicle according to claim 1, wherein the processor is further configured to:
determine the corrected position and the corrected direction of the host vehicle based on a correlation between the map information and the surrounding image.

3. The device of the host vehicle according to claim 1, wherein the processor is further configured to:
obtain a correlation image by performing predetermined frequency analysis on an image associated with the map information and the surrounding image;
set a search range on the correlation image, based on the correction instruction; and
compare the map information and the surrounding image, based on the search range.

4. The device of the host vehicle according to claim 1, wherein the processor is further configured to:
generate, as the surrounding image, an overhead image of the surroundings of the host vehicle.

5. The device of the host vehicle according to claim 1, wherein the processor is further configured to:
control the display to display the map information including line data indicating a lane superimposed on the surrounding image.

6. The device of the host vehicle according to claim 1, wherein the processor is further configured to:
control the display to display the map information including at least one of a road marking and a sign superimposed on the surrounding image.

7. A method comprising:
obtaining map information of surroundings of a host vehicle;
obtaining a surrounding image of the surroundings of the host vehicle;
comparing the map information and the surrounding image;
determining a position and a direction of the vehicle, based on comparing the map information and the surrounding image;
controlling a display to display the map information superimposed on the surrounding image, based on the position and the direction of the host vehicle;
receiving, from an input device of the host vehicle, a correction instruction input by a user of the host vehicle for correcting a position shift between the map information superimposed on the surrounding image;
comparing the map information and the surrounding image, based on the correction instruction;
determining a corrected position and a corrected direction of the host vehicle, based on comparing the map information and the surrounding image; and
transmitting a control signal identifying the corrected position and the corrected direction of the host vehicle to a control apparatus of the host vehicle.

8. The method of claim 7, further comprising:
determining the corrected position and the corrected direction of the host vehicle based on a correlation between the map information and the surrounding image.

9. The method of claim 7, further comprising:
obtaining a correlation image by performing predetermined frequency analysis on an image associated with the map information and the surrounding image;
setting a search range on the correlation image, based on the correction instruction; and
comparing the map information and the surrounding image, based on the search range.

10. The method of claim 7, further comprising:
generating, as the surrounding image, an overhead image of the surroundings of the host vehicle.

11. The method of claim 7, further comprising:
controlling the display to display the map information including line data indicating a lane superimposed on the surrounding image.

12. The method of claim 7, further comprising:
controlling the display to display the map information including at least one of a road marking and a sign superimposed on the surrounding image.

* * * * *